United States Patent [19]

Vulis et al.

[11] 4,176,238

[45] Nov. 27, 1979

[54] COOLED MULTIPHASE AC CABLE

[75] Inventors: Mikhail L. Vulis; Valery A. Golenchenko; Igor V. Rybin; Pavel B. Shenderovich, all of Moscow, U.S.S.R.

[73] Assignee: Gosudarstvenny Nauchno-Issledovatelsky Energetichesky Institut Imeni G.M. Krzhizhanovskogo (ENIN), Moscow, U.S.S.R.

[21] Appl. No.: 870,860

[22] Filed: Jan. 19, 1978

[51] Int. Cl.² .......................................... H01B 12/00
[52] U.S. Cl. .................................. 174/15 S; 174/36; 174/128 S
[58] Field of Search ............ 174/15 S, 15 CA, 128 S, 174/120 SC, 34, 36

[56] References Cited

U.S. PATENT DOCUMENTS

| 3,292,016 | 12/1966 | Kafka | 174/15 S X |
|---|---|---|---|
| 3,390,703 | 7/1968 | Matlow | 174/15 S |
| 3,612,742 | 10/1971 | Snowden | 174/15 S |
| 3,643,002 | 2/1972 | Minnich | 174/15 S |
| 3,675,042 | 7/1972 | Merriam | 174/15 S |
| 3,749,811 | 7/1973 | Bogner et al. | 174/15 S |
| 3,780,206 | 12/1973 | Reynolds | 174/120 SC X |
| 3,947,622 | 3/1976 | Graneau | 174/15 S |
| 4,039,740 | 8/1977 | Iwata | 174/15 S |

FOREIGN PATENT DOCUMENTS

| 1505605 | 11/1967 | France | 174/15 S |
|---|---|---|---|
| 1541728 | 9/1968 | France | 174/15 S |
| 4716518 | 11/1978 | Japan | 174/15 S |

*Primary Examiner*—Arthur T. Grimley
*Attorney, Agent, or Firm*—Burgess, Ryan and Wayne

[57] ABSTRACT

A cooled multiphase ac cable comprising a means for protecting the cable against the effect of the axial magnetic flux, made of a superconducting material in the form of a plurality of closed conductors separately embracing the surfaces of the internal and external layers of stabilized superconducting material of the cable phases. The closed conductors embracing the surface of the external layer of stabilized superconducting material are electrically associated. The proposed multiphase cable is simple in manufacture, reliable in service and adequately protected against the effect of the axial magnetic flux.

5 Claims, 3 Drawing Figures

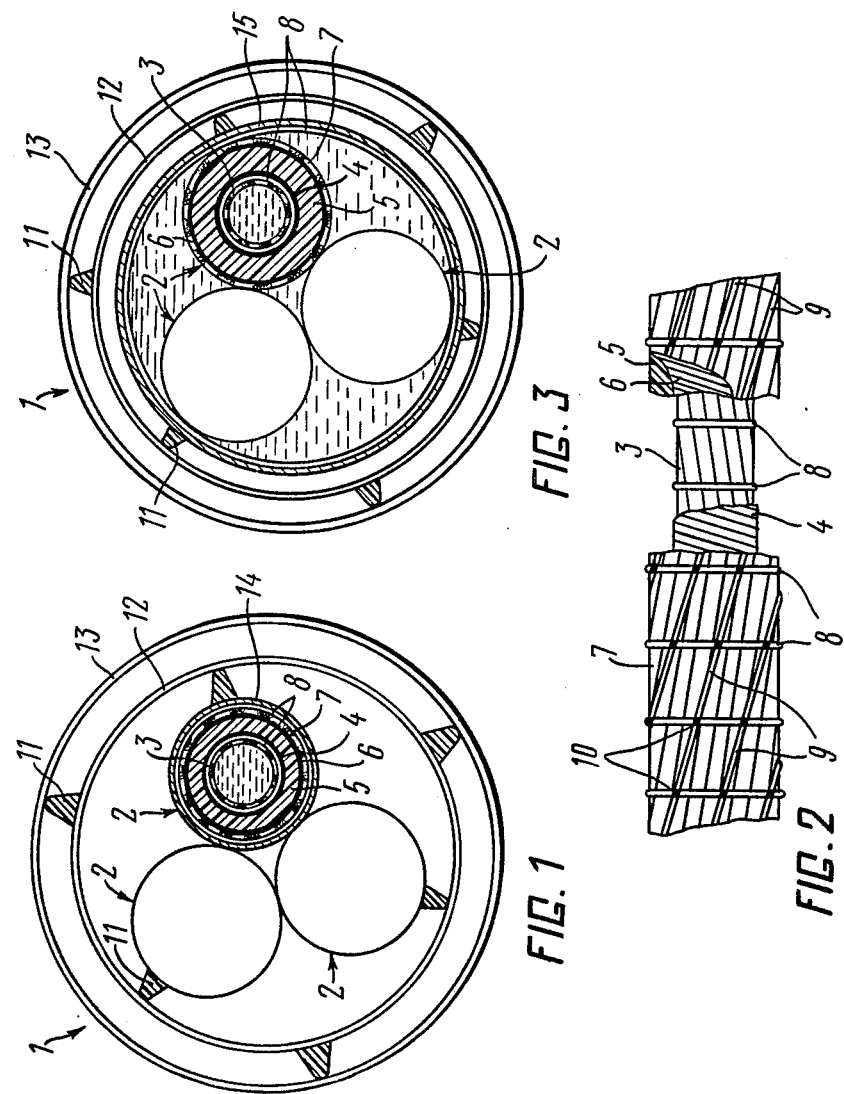

COOLED MULTIPHASE AC CABLE

This invention relates to electrical engineering, and more particularly to a cooled multiphase ac cable.

Multiphase ac cables are used primarily in superconducting electric power transmission lines.

Known in the art are ac cables with current-carrying elements made of helically wound superconductors. In general, each phase of the cable comprises concentric arrangement of helically wound internal layer of stabilized superconducting material, electrostatic shielding layer, layer of dielectric, electrostatic shielding layer and external layer of stabilized superconducting material. Such an arrangement of the cable elements is responsible for an axial magnetic flux, whose magnitude depends on the pitch of the superconducting material helix, selected according to the required conditions of thermal compensation of the cable. This time-variable magnetic flux induces a current in all the surrounding electroconducting elements forming closed circuits. The surface contact of such elements with the main cooling medium of the cable phases increases the thermal load carried by the refrigerating station to an inadmissible level.

The main source of heat within the cable is the sealing pipe that is made of steel and limits the working area of the cold zone. Other sources of heat are the electrostatic shield and stabilizing backing of the superconductor. In cases where the cable phases are arranged in a common sealing pipe, an inadmissible amount of heat is released within the pipe due to the difference in phase loads.

Also known are cables provided with a means for protection against the effect of the axial magnetic flux (cf. J. Sutton, "Induced Circumferential Currents and Losses in Flexible Superconducting Cables," Cryogenics, 1975, v.15, No. 9, p.544, Section "Ferromagnetic Loading of Space Between Pipe and Cables").

The above protecting means is in the form of a thin-walled cylinder of ferromagnetic material placed coaxially between the phase and sealing pipe. The released heat is reduced by making the sealing pipe wall of a thickness greater than the depth of penetration of the magnetic field into the material of the pipe. To retain the flexibility of the sealing pipe, it is to be made of very pure materials of high electric conductivity. This reduces the mechanical strength of the material and is accompanied by considerable hysteresis losses in the ferromagnetic material.

There is also known a cooled multi-phase ac cable wherein each phase comprises a concentric arrangement of helically wound layer of stabilized superconducting material, layer of electrostatic shielding material, layer of dielectric, second layer of electrostatic shielding material and external layer of stabilized superconducting material, and is provided with a means for protection of the cable against the effect of the axial magnetic flux, made of superconducting material (cf. J. Sutton, "Induced Circumferential Currents and Losses in Flexible Superconducting Cables," Cryogenics, 1975, v.15, No. 9, p.544, Section "Superconducting Helium Pipes").

The means for protection against the effect of the axial magnetic flux of the above cable is in the form of a layer of superconducting material applied directly to the protected element of the cable, i.e., the inner surfaces of the sealing pipe that may be used to seal each phase separately or all the phases together. Superconductors of high critical temperature and low hysteresis losses serve as the material covering the sealing pipe. Those conditions are met by superconductors based on intermetallic compounds. Such superconductors are, however, highly brittle. This complicates the cable design and worsens its service reliability. Moreover, the above method of protection does not prevent the release of heat in the stabilizing backing of the superconductor and electrostatic shield.

It is an object of the present invention to simplify the constructional features of a cooled multiphase ac cable and to improve its service reliability.

Another object of the invention is to improve the reliability of the cable protecting means.

These objects are accomplished by that in a cooled multiphase ac cable wherein each phase comprises a concentric arrangement of helically wound internal layer of stabilized superconducting material, layer of electrostatic shielding material, layer of dielectric, second layer of electrostatic shielding material and external layer of stabilized superconducting material, provided with a means for protecting the cable against the effect of the axial magnetic flux, made of a superconducting material, the means for protecting against the axial magnetic flux is, in accordance with the present invention, in the form of a plurality of closed conductors separately embracing the surfaces of the internal and external layers of stabilized superconducting material of the cable phases, the closed conductors embracing the surface of the external layer of stabilized superconducting material being electrically associated.

The embodiment of the protecting means as a plurality of flexible closed conductors simplifies the manufacture of the cable and improves its service reliability. The coaxial arrangement of the plurality of flexible closed conductors embracing the internal superconducting surface of the cable phases provides for protection of the stabilizing backing of the superconductor against the effect of the axial magnetic field by displacing the magnetic field. The electrical coupling of the closed conductors embracing the outer superconducting surfaces of the phases and their coaxial arrangement in respect to the inner surface of the sealing pipe protects the pipe against the effect of the axial magnetic field by compensating its effect.

The present invention will now be described in greater detail with reference to the accompanying drawings, wherein:

FIG. 1 is a cross-sectional view of a cooled multiphase ac cable according to the invention;

FIG. 2 is a partially cut out view of ac cable provided with a plurality of closed conductors, according to the invention;

FIG. 3 is a cross-sectional view of a cooled multiphase ac cable with the cooling agent flowing through the cable phases, according to the invention.

The proposed cooled multiphase ac cable (FIG. 1) comprises three phases 2. Each phase 2 has a concentric arrangement of helically wound internal layer 3 of stabilized superconducting material, layer 4 of electrostatic shielding material, layer 5 of dielectric, second layer 6 of electrostatic shielding material and external layer 7 of stabilized superconducting material. The cable 1 also comprises a means 8 for protection against the effect of the axial magnetic flux, made of a superconducting material. The protecting means 8 is in the form of a plurality of closed conductors separately embracing the surfaces of the internal layer 3 and external layer 7 of stabilized superconducting material. The closed conductors embracing the surface of the external layer 7 are electrically associated.

The closed conductors of the present embodiment are in the form of rings (FIG. 2). The rings embracing the external layer 7 are electrically interconnected by conductors 9 at points 10.

The cooling agent is helium passed, according to a first embodiment, inside the phase 2 (FIG. 1), and, according to a second embodiment, inside and outside the phase 2 (FIG. 3).

Besides, the cable 1 (FIG. 1) is provided with supports 11, a radiation shield 12 and a shell 13 with an evacuated cavity. The space between sealing pipes 14 and the shield 12 is also evacuated.

According to the second embodiment, the space between a sealing pipe 15 (FIG. 3) and the shield 12 is also evacuated.

In the course of operation, the means 8 for protection of the cable 1 displaces the axial magnetic flux out of the areas confined by the layer 3 of each phase 2, by inducing a shielding current in the conductors and compensating the magnetic flux at the point of location of the helium sealing pipe 14 and 15 by means of conductors electrically coupled to conductors 9 made of a superconducting material in which an electric current is also induced.

The herein-proposed multiphase ac cable is easy in manufacture, reliable in service, adequately protected against the effect of the axial magnetic field, and of improved dynamic stability.

What is claimed is:

1. A cooled multiphase ac cable comprising:
   a helically wound internal layer of stabilized superconducting material per phase;
   a layer of material, per phase, serving as an electrostatic shield of a respective phase, arranged helically on said internal layer of stabilized superconducting material and concentrically thereto;
   a layer of dielectric, per phase, arranged helically on said layer of material serving as an electrostatic shield of a respective phase and concentric ally thereto;
   a second layer of material, per phase, serving as an electrostatic shield of a respective phase, arranged helically on said layer of dielectric and concentrically thereto;
   an external layer of stabilized superconducting material, per phase, arranged helically on said second layer of material serving as an electrostatic shield of a respective phase and concentrically thereto;
   a plurality of closed conductors of superconducting material serving as a means for protecting said multiphase ac cable against the effect of the axial magnetic flux;
   a group of said closed conductors of said plurality of conductors, embracing the surface of said internal layer of each said phase;
   a group of said closed conductors of said plurality of conductors, embracing said external layers of said phases and being electrically associated.

2. A superconducting multiphase alternating current cable comprising:
   a cylindrical outer shell;
   a plurality of coaxial cable elements disposed within said shell, each element corresponding to one phase of said cable;
   conduit means within said shell for accomodating a fluid for cooling said cable elements to a superconducting temperature;
   each of said cable elements comprising:
      a helically wound internal layer of stabilized superconducting material;
      a plurality of spaced coils of superconducting material surrounding said internal layer, each of said coils comprising a single turn oriented in a plane substantially perpendicular to the axis of the corresponding cable element;
      a layer of electrostatic shielding material surrounding said internal layer and said coils;
      a dielectric layer surrounding said electrostatic shielding layer;
      a second layer of electrostatic shielding material surrounding said dielectric layer;
      a helically wound external layer of stabilized superconducting material disposed on said second layer of electrostatic shielding material;
      a second plurality of spaced coils of superconducting material surrounding said external layer, each coil comprised of a single turn disposed in a plane perpendicular to the longitudinal axis of the corresponding cable element.

3. The cable according to claim 2, wherein said first plurality of spaced coils is electrically connected to said internal layer and said second plurality of spaced coils is electrically connected to said external layer.

4. A superconducting multiphase alternating current cable comprising:
   a cylindrical outer shell;
   a plurality of coaxial cable elements disposed within said shell, each element corresponding to one phase of said cable;
   conduit means within said shell for accomodating a fluid for cooling said cable elements to a superconducting temperature;
   each of said cable elements comprising:
      a helically wound internal layer of stabilized superconducting material;
      a plurality of spaced coils of superconducting material surrounding said internal layer, each of said coils comprising a single turn oriented in a plane substantially perpendicular to the axis of the corresponding cable element;
      a layer of electrostatic shielding material surrounding said internal layer and said coils;
      a dielectric layer surrounding said electrostatic shielding layer;
      a second layer of electrostatic shielding material surrounding said dielectric layer;
      a helically wound external layer of stabilized superconducting material disposed on said second layer of electrostatic shielding material;
   a hollow cylindrical sealing pipe disposed within and spaced apart from said shell, all of said cable elements and said conduit means being disposed within said sealing pipe;
   a second plurality of spaced coils of superconducting material within said sealing pipe adjacent the internal surface thereof, each of said coils comprising a single turn surrounding all of said cable elements and disposed in a plane substantially normal to the longitudinal axes thereof, said axes being mutually parallel.

5. The cable according to claim 4, wherein said first plurality of spaced coils is electrically connected to said internal layer and said second plurality of spaced coils is electrically connected to the external layers of all of said cable elements.

* * * * *